United States Patent [19]
Bollyky

[11] 3,816,326
[45] June 11, 1974

[54] ELECTRONEGATIVELY SUBSTITUTED CARBOXYPHENYL OXALATES AS SUPERIOR CHEMILUMINESCENT MATERIALS

[75] Inventor: Laszlo Joseph Bollyky, Stamford, Conn.

[73] Assignee: American Cyanamid Company, Stamford, Conn.

[22] Filed: Dec. 18, 1969

[21] Appl. No.: 886,406

[52] U.S. Cl.......................... 252/188.3 CL, 252/186
[51] Int. Cl................................................ C09k 3/00
[58] Field of Search.................... 252/186, 188.3 CL

[56] References Cited
OTHER PUBLICATIONS
Raubut et al., J. Am. Chem., Soc. 89, 6516 (1967).

Primary Examiner—John D. Welsh
Attorney, Agent, or Firm—Charles J. Fickey

[57] ABSTRACT

New compounds which are reactive with hydrogen peroxide in the presence of a solvent and a fluorescer to produce visible chemiluminescent light. The light capacity of the electronegatively substituted carboxyphenyl oxalate reaction is superior to that of the similarly electronegatively substituted phenyl oxalate reaction.

10 Claims, No Drawings

ELECTRONEGATIVELY SUBSTITUTED CARBOXYPHENYL OXALATES AS SUPERIOR CHEMILUMINESCENT MATERIALS

This invention relates to a chemiluminescent light system using the reaction of an aryl oxalate ester and a peroxide in a diluent in the presence of a fluorescer wherein higher light capacity is obtained by having carboxy substituents on the aryl groups of the oxalate ester.

It has been established by Bollyky and Rauhut, in copending application Ser. No. 619,140 now abandoned and elsewhere, that superior chemical lighting from the reaction of oxalate esters with fluorescers and hydrogen peroxide, in a diluent, requires an oxalate ester with a high order of reactivity toward hydrogen peroxide. The reactivity of an aromatic ester toward displacement of aromatic phenol by a nucleophile such as hydrogen peroxide can be estimated with substantial accuracy with reference to the Hammett sigma constants of the substituent groups on the displaced aromatic phenol. (See Table I for representative Hammett sigma constant values).

1. L. J. Bollyky, M. Loy, B. G. Roberts, R. H. Whitman, A. V. Iannotta, A. M. Semsel, M. M. Rauhut. Abstracts, 153-rd National Meeting of the American Chemical Society, Miami Beach, Florida, April 1967 No. 0-169, M. M. Rauhut, L. J. Bollyky, B. G. Roberts, M. Loy, R. H. Whitman, A. V. Iannotta and R. A. Clarke, J. Am. Chem. Soc. 89 6515 (1967)

TABLE I

Sigma Constants for Substituent Groups in Phenols[a]

| Group | Ortho Sigma | Meta Sigma | Para Sigma |
|---|---|---|---|
| -H | 0 | 0 | 0 |
| -OCH$_3$ | 0 | 0.08 | -0.11 |
| -CH$_3$ | -0.13 | -0.07 | -0.17 |
| -CH$_2$CH$_2$CH$_3$ | -0.09[b] | -0.05 | -0.13 |
| -CH(CH$_3$)$_2$ | -0.23 | -0.07 | -0.15 |
| -C(CH$_3$)$_3$ | -0.52 | -0.10 | -0.20 |
| -CH$_2$OH | 0.04 | 0.08 | 0.08 |
| -F | 0.54 | 0.34 | 0.06 |
| -Cl | 0.68 | 0.37 | 0.23 |
| -Br | 0.70 | 0.39 | 0.27 |
| -NO$_2$ | 1.24 | 0.71 | 1.24 |
| -CF$_3$ | — | 0.47 | 0.54 |
| -CN | — | 0.61 | 0.88 |
| $-\overset{O}{\overset{\|}{C}}OH$ | .95[b] | 0.37 | 0.41 |
| $-\overset{O}{\overset{\|}{C}}OR$ | .45[b] | 0.37 | 0.45 | a. Data from G. B. Barlin and D. D. Perrin, Quart. Rev., 20, 75(1966).
b. Estimated.

Thus, while all oxalate esters are believed to produce detectable light when reacted with hydrogen peroxide, a fluorescer, and, if desired, a basic catalyst, in a diluent, the production of superior light intensities from an aromatic oxalate ester requires that the aromatic residue be substituted with sufficient electronegative substituents to provide a sigma constant sum of at least about 1.4 The values of Hammett sigma constants for a large number of substituents are available in the literature [see for example, G. B. Barlin and D. D. Perrin, Quart. Re., 20, 75(1966)]. Thus, in general, the structures of superior aromatic oxalate esters are readily predictable.

While H$_2$O$_2$ has been indicated as the reactant, it has been also found that hydroperoxide compounds in general will also be effective (as disclosed in copending, commonly assigned U.S. application Ser. No. 619,140, filed Feb. 28, 1967).

Prior to this invention, however, the light output per unit volume (the light capacity) of oxalate ester chemical lighting systems has been limited by a serious loss of chemiluminescent efficiency (that is, a reduction in quantum yield) as the concentration of oxalate ester increased. The light capacity is a major criterion for the utility of a chemical lighting system in that the light capacity determines the maximum brightness and useful lifetime of light emission. Thus the light capacity (L) (in units of lumen hours liter $^{-1}$) is related to the brightness and lifetime by:

$$L = \int_{T=0}^{T=\infty} I\,dT/V$$

where:
I is the intensity in lumens,
T is the time in hours, and
V is the volume of the system in liters.
It can be shown that $$L = 4.07 \times Q \times C \times P,$$

where:
Q is the chemiluminescent quantum yield (in units of einsteins per mole of oxalate ester),
C is the concentration of oxalate ester (in units of moles liter $^{-1}$), and
P is a "photoptic" constant which defines the ability of the human eye to see the color of the emitted light.

It is clear from this equation that high light capacities require high quantum yields (Q) at high oxalate concentrations (C), and it is thus readily seen why earlier oxalate ester chemical lighting systems have been limited in light capacity. Thus, at the high oxalate concentrations required for high light capacity, low quantum yields were obtained so that high light capacities were impossible. Indeed, previous oxalate ester chemical light systems have been limited to optimum oxalate ester concentrations below 0.04M and light capacities have been limited to below about 125 lumen hours liter $^{-1}$ as in copending, commonly assigned application Ser. No. 813,973, filed Apr. 7, 1969 now abandoned.

It is therefore an object of this invention to provide a chemiluminescent system having a higher light output than those heretofore.

A further object is to provide a method for improving the brightness and useful lifetimes of oxalate ester chemiluminescent systems.

These and other objects of the invention will become apparent as the description thereof proceeds.

I have unexpectedly discovered that the introduction of a carboxy substituent into the aromatic portion of an aryl oxalate substantially reduces the loss in quantum yield obtained with increasing oxalate ester concentration and permits the attainment of high light capacities. This reduction in concentration-derived quantum yield loss obtained by carboxy substitution is limited to substituted phenyl oxalates in which the sum of the Hammett sigma constants of the substituents is less than about 2.7. Thus carboxy phenyl oxalate esters substituted additionally by other electronegative substituents, so that the sum of all the sigma constants of the substituents lies between 1.4 and about 2.7, provide high quantum yields at high oxalate ester concentrations to give light capacities about 300 lumen hours liter$^{-1}$. Since the carboxy substituent, which is essential to this result, has a Hammett sigma constant of about 0.9, the sum of the sigma constants of the additional substituents required for high light capacity must be at least about 0.5.

The general class of compounds may be represented by the formula:

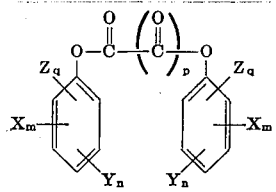

where:
X represents one or more electronegative substituents, i.e., one having a Hammett sigma constant greater than zero, as previously defined,
Y represents a carboxy group,
Z represents an alkyl or alkoxy group,
m, n and q are integers such that the combined Hammett sigma constant of the X, Y and Z substituents on each phenyl groups is at least about 1.4 to 2.7.
In the above, each of m and n is always at least one, and
p is an integer at least one.

X$m$ may represent several different electronegative substituents. Moreover, the aryl oxalate may be additionally substituted by such non-electronegative substituents as alkyl and para-alkoxy, provided only that the sigma sum of all the substituents is at least about 1.4 to 2.7.

Representative carboxyphenyloxalate esters capable of high light capacity are illustrated in Table II.

TABLE II.—REPRESENTATIVE OXALATE ESTERS CAPABLE OF SUPERIOR LIGHT CAPACITIES

| Sum of sigma constants for substituent groups (excluding one carboxy group) | P—O—C(=O)—C(=O)—O—P (where P—O— is as follows:) | |
|---|---|---|
| 1.28 | (structure) | Bis(2-carboxy-3,4,6-trichlorophenyl) oxalate. |
| 1.59 | (structure) | Bis(3-carboxy-2,4,6-trichlorophenyl) oxalate. |
| 1.73 | (structure) | Bis(4-carboxy-2,3,6-trichlorophenyl) oxalate. |
| 1.96 | (structure) | Bis(5-carbalkoxy-3-carboxy-2,4,6-trichlorophenyl) oxalate. |
| 1.65 | (structure) | Bis(3,carbalkoxy-2-carboxy-4,5,6-trichlorophenyl) oxalate. |
| 1.87 | (structure) | Bis(4-carbalkoxy-2-carboxy-3,5,6-trichlorophenyl) oxalate. |
| 1.73 | (structure) | Bis(5-carbalkoxy-2-carboxy-3,4,6-trichlorophenyl) oxalate. |
| 1.42 | (structure) | Bis(6-carbalkoxy-2-carboxy-3,4,5-trichlorophenyl) oxalate. |
| 1.92 | (structure) | Bis(2,6-dicarboxy-3,4,5-trichlorophenyl) oxalate. |
| 1.65 | (structure) | Bis(2,3-dicarboxy-4,5,6-trichlorophenyl) oxalate. |
| 1.83 | (structure) | Bis(2,4-dicarboxy-3,4,5-trichlorophenyl) oxalate. |
| 1.65 | (structure) | Bis(2,5-dicarboxy-3,4,6-trichlorophenyl) oxalate. |

TABLE II—Continued

| Sum of sigma constants for substituent groups (excluding one carboxy group) | $\overset{O}{\underset{\|}{P-O-C}}-\overset{O}{\underset{\|}{C}}-O-P$ (where P—O— is as follows:) | |
|---|---|---|
| 1.96 | 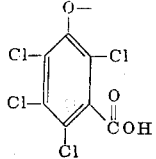 | Bis(3-carboxy-2,4,5,6-tetrachlorophenyl) oxalate. |
| 1.65 | 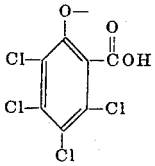 | Bis(2-carboxy-3,4,5,6-tetrachlorophenyl) oxalate. |
| 2.10 | 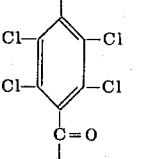 | Bis(4-carboxy-2,3,5,6-tetrachlorophenyl) oxalate. |
| 1.28 | 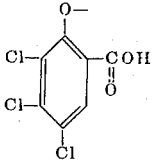 | Bis(6-carboxy-2,3,4-trichlorophenyl) oxalate. |
| 1.28 | 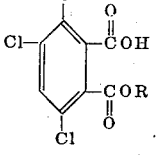 | Bis(3-carbalkoxy-2-carboxy-4,6-dichlorophenyl)oxalate. |
| 1.28 | 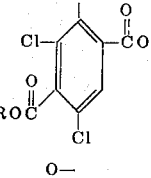 | Bis(3-carbalkoxy-6-carboxy-2,4-dichlorophenyl)oxalate. |
| 1.28 | 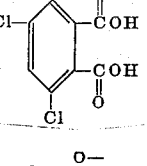 | Bis(2,5-dicarboxy-4,6-dichlorophenyl) oxalate. |
| 1.55 | 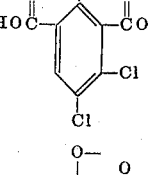 | Bis(2,6-dicarboxy-3,4-dichlorophenyl) oxalate. |
| 1.28 | 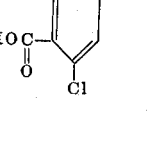 | Bis(2,5-dicarboxy-4,6-dichlorophenyl) oxalate. |
| 1.65 | 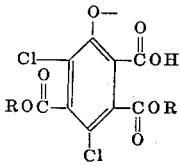 | Bis(3,5-dicarbalkoxy-2-carboxy-4,6-dichlorophenyl) oxalate. |
| 2.08 | 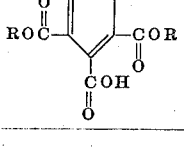 | Bis(3,5-dicarbalkoxy-4-carboxy-2,6-dichlorophenyl) oxalate. |
| 1.64 | 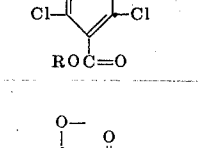 | Bis(4,6-dicarbalkoxy-2-carboxy-3,5-dichlorophenyl) oxalate. |
| 1.67 | 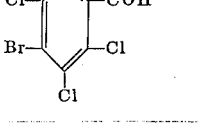 | Bis(3-bromo-6-carboxy-2,4,5-trichlorophenyl) oxalate. |
| 1.30 | 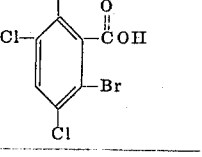 | Bis(3-bromo-2-carboxy-4,6-dichlorophenyl)oxalate. |
| 1.62 | 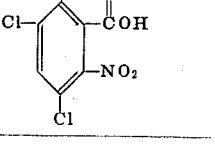 | Bis(2-carboxy-4,6-dichloro-3-nitrophenyl)oxalate. |
| 1.38 | 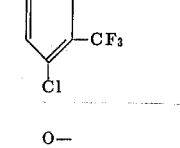 | Bis[2-carboxy-4,6-dichloro-3-(trifluoromethyl)-phenyl]oxalate. |
| 1.52 | 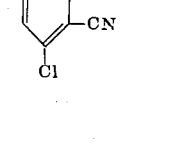 | Bis(2-carboxy-4,6-dichloro-3-cyanophenyl)oxalate. |

TABLE II—Continued

| Sum of sigma constants for substituent groups (excluding one carboxy group) | $P-O-\overset{O}{\underset{\|}{C}}-\overset{O}{\underset{\|}{C}}-O-P$ (where P—O— is as follows:) | |
|---|---|---|
| 1.36 | 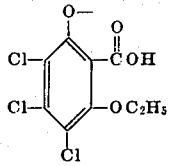 | Bis(2-carboxy-4,5,6-trichloro-3-ethoxyphenyl)oxalate. |
| 1.36 | 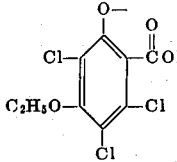 | Bis(2-carboxy-3,4,6-trichloro-5-ethoxyphenyl)oxalate. |
| 1.21 | 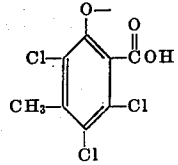 | Bis(2-carboxy-3,4,6-trichloro-5-methylphenyl)oxalate. |
| 1.57 | 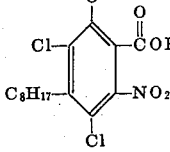 | Bis(2-carboxy-4,6-dichloro-3-nitro-5-octylphenyl)oxalate. |
| 1.29 | 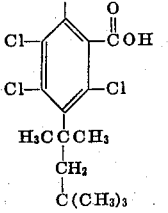 | Bis[2-carboxy-3,5,6-trichloro-4-(1,1,3,3-tetramethylbutyl)-phenyl]-oxalate. |
| 1.28 | 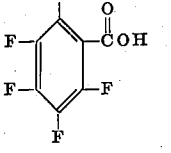 | Bis(2-carboxy-3,4,5,6-tetrafluorophenyl)-oxalate. |
| 1.36 | 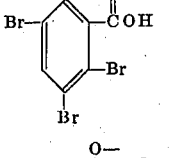 | Bis(3,4,6-tribromo-2-carboxyphenyl)-oxalate. |
| 1.29 | 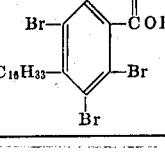 | Bis(2,4,5-tribromo-6-carboxy-3-hexadecylphenyl)-oxalate. |

There are a number of variables which influence the chemiluminescent reaction and the amount of light output, light intensity and time of illumination. These are listed as follows:

1. Oxalate structure,
2. Oxalate concentration,
3. Fluorescer structure,
4. Fluorescer concentration,
5. Catalyst structure,
6. Catalyst concentration,
7. H₂O₂ concentration,
8. Distribution of reactants into components,
9. Selection of solvents for components, and
10. Reaction temperature.

The effect of these variables on the reaction is discussed in subsequent paragraphs.

1. Oxalate Structure

The oxalate ester of this invention is a bis(phenyl) oxalate ester having the formula:

$$PO\overset{O}{\underset{\|}{C}}\overset{O}{\underset{\|}{C}}OP,$$

in which the phenyl groups (P) are substituted by (1) at least one carboxy group of the formula $$-\overset{O}{\underset{\|}{C}}OH$$

in which (2) the phenyl groups, P, are substituted by at least two additional substituents selected from the group comprising fluoro, chloro, bromo, cyano, trifluoromethyl, carbalkoxy, nitro, alkoxy, alkoxy methyl, methyl, and higher alkyl, said additional substituents being selected so that the sum of their Hammett sigma constants for phenols lies between about 1.0 and 2.3.

The preferred subclass has the carboxy substituent ortho to the phenolic oxygen.

The preferred species is bis(2,4,5-trichloro-6-carboxyphenyl)oxalate.

2. Oxalate Concentration

The oxalate concentration in the reacting system may vary widely from 0.01M to 1.5M. Preferably, the concentration is 0.03M to 0.3M.

3. Fluorescer Structure

The fluorescent compounds contemplated herein are numerous; and they may be defined broadly as those which do not readily react on contact with the peroxide employed in this invention, such as hydrogen peroxide; likewise they do not readily react on contact with the ester of oxalic acid. Typical suitable fluorescent compounds for use in the present invention are those which have a spectral emission falling between 330 millimicrons and 1,000 millimicrons and which are at least partially soluble in any of the above diluents, if such diluent is employed. Among these are the conjugated polycyclic aromatic compounds having at least 3 fused rings, such as: anthracene, substituted, anthracene, benzanthracene, phenanthrene, substituted phenanthrene, naphthacene, substituted naphthacene, pentacene, substituted pentacene, perylene, substituted perylene and the like. Typical substituents for all of these are phenyl, lower alkyl, chlorine, bromine, cyano, alkoxy ($C_1$–$C_{16}$), and other like substituents which do not interfere with the light-generating reaction contemplated in the present chemiluminescent process.

Numerous other fluorescent compounds having the properties given hereinabove are well known in the art. Many of these are fully described in "Fluorescence and Phosphorescence," by Peter Pringsheim, Interscrience Publishers, Inc., New York, N.Y., 1969. Other fluorescers are described in "The Colour Index," Second Edition, Volume 2, The American Association of Textile Chemists and Colorists, 1956, pp. 2907–2923. While only typical fluorescent compounds are listed hereinabove, the person skilled in the art is fully aware of the fact that this invention is not so restricted, and that numerous other fluorescent compounds having similar properties are contemplated for use herein.

The preferred fluorescers are 9,10-bis(phenylethynyl)-anthracene, 1-methoxy-9,10-bis(phenylethynyl)anthracene, 9,10-diphenylanthracene and perylene.

4. Fluorescer Concentration

The fluorescer concentration in the reacting system is broadly 0.0002 to 0.03, preferably 0.001 to 0.005.

5. Catalyst Structures

Catalyst structures include broadly, basic catalysts including amines, hydroxide, alkoxide, carboxylic acid salts and phenolic salts. Preferred are salts of carboxylic acids and phenols whose conjugate acids have pKa values between 1 and 6, as measured in aqueous solution, as in commonly assigned application Ser. No. 813,846, filed Apr. 7, 1969, now U.S. Pat. No. 3,552,582.

Some preferred examples of catalysts are sodium salicylate, tetrabutylammonium salicylate, potassium salicylate, tetrahexylammonium benzoate, benzyltrimethylammonium m-chlorobenzoate. Other catalysts may be dimagnesium ethylenediamine tetraacetate, tetraethyl ammonium stearate, calcium stearate, magnesium stearate, calcium hydroxide, magnesium hydroxide, lithium stearate, triethyl amine, pyridine, piperadine, imidazole, triethylene diamine and potassium trichlorophenoxide.

6. Catalyst Concentration

The optimum catalyst concentration in the reacting system depends on catalyst structure but, in general, is broadly zero to 0.1M, preferably zero to 0.01M.

7. $H_2 O_2$ Concentration

The $H_2 O_2$ concentration in the reacting system is broadly 0.01M to 10M. Preferably, the $H_2 O_2$ concentration is from equal to the oxalate concentration to four times the oxalate concentration.

8. Component Formulation

The order of combining the reactants for obtaining chemiluminescent light is not critical. A reaction and chemiluminescent light could be obtained by combining all necessary materials in the suitable solvent simultaneously or in any order. However, for a practical lighting system or device, the reactants may be formulated as combinations in separate components in such a way that a reaction and a chemiluminescent light do not occur until the separate components are combined. Thus the brightness and lifetime recorded in the tables can be obtained by:

1. Mixing separate solutions of each individual reactant in any order, providing there is no undue delay,
2. Combining the oxalate and fluorescer in a solvent as an "oxalate" component, combining the $H_2 O_2$ and catalyst in a solvent as a "peroxide component," and combining the two components, or
3. Combining the oxalate component of (2) with $H_2 O_2$ (either dissolved in a solvent or as a pure liquid) and with a catalyst (either dissolved in a solvent or a pure liquid or solid.

Good performance can also be obtained by putting the oxalate and fluorescer in solution or as solids on a substrate and activating with a solution of $H_2 O_2$ and a catalyst (as disclosed in copending, commonly assigned U.S. application Ser. No. 741,517, filed July 1, 1968, now abandoned. Carboxy substituted phenyl oxalates are eminently suitable for this application because they dissolve rapidly in polyether solvents such as diethylene glycol diethyl ethers. In the absence of the carboxy substituent phenyl oxalates dissolve slowly after long stirring in organic solvents. Also the oxalate, fluorescer and catalyst may be combined as solids and the combination either alone or in a substrate can be activated by treating with $H_2 O_2$ in a solvent such as diethylene glycol diethyl ether or dimethylphthalate.

9. Solvents

Solvents for the chemiluminescent components are organic solvents of a number of types, set forth as follows.

1. Oxalate components in solution:
   a. Ethers and polyethers such a diethylene glycol diethyl ether, diethylene glycol dimethyl ether, ethylene glycol dimethyl ethers;
   b. Broadly, esters such as ethyl acetate, ethyl benzoate, dimethyl phthalate, dibutyl phthalate, dioctyl phthalate, methyl formate, triacetin, diethyl oxalate, and dioctyl terphthalate are examples;
   c. Aromatic hydrocarbons such as benzene, toluene, ethyl benzene, butylbenzene;
   d. Chlorinated hydrocaronbs such as chlorobenzene, o-dichlorobenzene, m-dichlorobenzene, chloroform, carbon tetrachloride, hexachloroethane, tetrachlorotetrafluoropropane.

Of the solvents, the preferred are diethylene glycol diethyl ether, ethyl benzoate, dibutyl phthalate, and dimethyl phthalate.

2. Peroxide component containing bases:
Broadly, primary, secondary, and tertiary alcohols such as ethyl, hexyl, 2-ethylhexyl, 2-octanol, cyclohexyl, pinacol, glycerol, 1,3-propylene glycol, tertiary butanol and 3-methyl-3-pentanol are used.

The tertiary alcohols such as t-butyl, 3-methyl-3-pentanol, and 3,6-dimethyl-3-octanol are preferred.

3. Peroxide components without catalyst for a 2-component uncatalyzed system for a 3-component system, (fluorescer + oxalate) + catalyst + hydrogen peroxide or for systems in which a solid oxalate, a solid fluorescer, and a solid catalyst are combined as a component.

Broadly all of the above alcohols and esters in 9(1) above may be used. It is preferred to use dimethylphthalate or tertiary alcohols.

10. Reaction Temperature

Light intensities increase and lifetimes decrease with increasing temperature. However, temperature is not critical to the emission of light above about -40°C. The oxalates of this invention are superior to any previously known oxalates at all temperatures. The preferred range of operation is about −30°F. to +150°F.

In the examples quantitative chemiluminescence experiments were carried out in a 1-cm deep, 3-ml cylindrical quartz cuvette, positioned vertically at the entrance of a previously described calibrated spectroradiometerfluorimeter.[2] The rear surface of the cuvette was blackened to minimize reflection, and a magnetic stirrer was positioned vertically behind the cuvette to provide rapid mixing. Aliquotes of standardized stock solutions of oxalate ester, hydrogen peroxide, fluorescer, catalyst, and aolvent as required were combined in the cuvette using all-glass syringes. Separate stock solutions of individual reactants were generally used, but in some experiments the oxalate ester and fluorescer were combined in a single stock solution or the hydrogen peroxide and catalyst were combined in a single stock solution. No difference between these procedures was observed. In most experiments a solvent mixture containing an alcohol was used, and the alcohol component of the mixture was used only for stock solutions of hydrogen peroxide and catalyst, since oxalate esters react slowly with alcohols, and fluorescers tend to be poorly soluble. The order of reactant addition was not critical, although hydrogen peroxide and catalyst in that order were generally added last. Rapid mixing was obtained, and the mixing rate was not critical at the rapid stirrer speeds used. The experiments were not thermostated, but the ambient conditions maintained reaction temperatures at 25°C. ± 1°C.

2. B. G. Roberts and R. C. Hirt, *Applied Spectroscopy*, 21, 250 (1967).

The intensity of a 5 mu spectral segment located near the spectral maxima was recorded as a function of time using a United Systems Corporation Digitec recorder. Spectra were obtained as previously described[2] and were corrected for intensity decay with time during the spectral determination. The raw spectral and intensity decay data were processed as previously described[3] by a Scientific Data 930 Computer programmed with the calibration data to obtain corrected spectra, absolute spectrally-integrated intensities as a function of time, and quantum yields.

3. M. M. Rauhut, B. G. Roberts, and A. M. Semsel, *J. Am. Chem. Soc.*, 88, 3604 (1966).

EXAMPLE I

Bis(6-carboxy-2,4,5-trichlorophenyl)oxalate (TCAPO)

3,5,6-Trichlorosalicylic acid (12.7 g., 0.05M) and 9.3 g. (0.05 m) of dodecylamine were dissolved in 400 ml. of benzene. The solution was evaporated to dryness under an argon atmosphere to obtain a white solid which was washed with 80 ml. n-hexane to obtain 16.3 g. white product m.p. 118°C. − 119°C. This product was dissolved in a mixture of 160 ml. of benzene and 320 ml. of anhydrous ether. The solution was treated with 3.6 ml. (0.0423 m) of oxalyl chloride and 10.9 ml. (0.079 m) of triethylamine at 25°C. The mixture was stirred for 20 minutes and filtered. The mother liquor was evaporated to dryness, and the residue was washed successively with 160 ml. of n-hexane, and 300 ml. of boiling benzene to obtain 3.0 g. (14 percent) of white solid product, m.p. 168.5°C. − 169°C.

Anal. calcd. for $C_{16}H_4Cl_6O_8$: C, 35.79; H, 0.75; Cl, 39.62.

Found: C, 35.99; H, 0.84; Cl, 39.13.

EXAMPLE II

Bis(4-carboxy, 2,6-dichlorophenyl)oxalate (CDPO)

To a solution of 10.3 g. (0.05 m) of 2,6-dichloro-4-hydroxy benzoic acid in 200 ml. dry benzene and 600 ml. anhydrous ether, 2.3 ml. (0.027 m) oxalyl chloride and 6.95 ml. (0.05 m) triethylamine were added at 25°C. The mixture was stirred for one hour under argon, filtered and the mother liquor was evaporated to dryness to obtain the white solid which was slurried with 400 ml. of ether and filtered to obtain 3.3 g. (28.3%) of product m.p. 250°–2°d.

Anal. calcd. for $C_{16}H_6Cl_4O_8$: C, 41.06; H, 1.29; Cl, 30.30.

Found: C, 41.00; H, 1.86; Cl, 30.14.

EXAMPLE III

Quantitative Experiments with bis(2,4,5-trichloro-6-carboxyphenyl)oxalate (TCAPO)

A series of four experiments in diethylene glycol diethyl ether (DEC)- 3-methyl-3-pentanol (3M3P) solution are summarized in Table III. Substantially higher light capacities were obtained from TCAPO than available from trichlorophenyl oxalates containing no carboxy substituent at the best conditions. Under these not optimized conditions, TCAPO produced light capacities up to 305 lm. hr. $1^{-1}$. The light emission is brighter and faster in pure 100% DEC than in DEC-containing 25 percent 3-methyl-3-pentanol, but quantum yield and light capacity are approximately the same. The brightness increased and the light capacity decreased somewhat with increased concentration of the sodium salicylate catalyst.

TABLE III

CHEMILUMINESCENCE OF TCAPO SYSTEMS IN DIETHYL CARBITOL (DEC)
-3-METHYL-3-PENTANOL (MP) SOLVENT MIXTURES

| Expt. | TCAPO (M) | HPEA ($10^3$ M) | $H_2O_2$ (M) | Na Sal. ($10^3$ M) | DEC (% Vol.) | MP (% Vol.) | Rise[b] Time (mins.) | Intensity (ft. lbts. cm$^{-1}$) at (2 mins.) | (5 mins.) | (10 mins.) | (30 mins.) | (60 mins.) | (180 mins.) | Lr.Tm. ($t_{\frac{1}{2}}$ mins.) | Quantum[d] Yield ($10^2$ ein. mole$^{-1}$) | Light Capacity[e] (lum. hrs. liter$^{-1}$) |
|---|---|---|---|---|---|---|---|---|---|---|---|---|---|---|---|---|
| A. Carboxy Substituted Oxalate | | | | | | | | | | | | | | | | |
| 1 | 0.10 | 2.4 | 0.30 | 2.00 | 80 | 20 | 16.0 | 1.0 | 12.0 | 24.0 | 23 | 13.0 | 1.7 | 86 | 10.7 | 305 |
| 2 | 0.10 | 2.4 | 0.30 | 5.00 | 80 | 20 | 6.5 | 45.0 | 58.0 | 56.0 | 19 | 5.5 | 4.0 | 33 | 9.41 | 268 |
| 3 | 0.10 | 2.4 | 0.30 | 5.00 | 100 | 0 | 4.2 | 65.0 | 79.0 | 57.0 | 15 | 3.7 | 4.0 | 25 | 9.01 | 257 |
| 4 | 0.25 | 3.0 | 0.50 | 2.00 | 80 | 20 | 30.2 | 1.7 | 4.2 | 7.6 | 13 | 12.0 | 3.6 | 162 | 4.10 | 292 |
| B. Oxalates With No Carboxy Substituent | | | | | | | | | | | | | | | | |
| 2,4,6-TCPO: (bis(2,4,6-trichlorophenyl)oxalate) | | | | | | | | | | | | | | | | |
| 5 | 0.02 | 3.0 | 0.075 | 1.25 | 92[f] | 8[g] | 18.0 | --- | --- | 23.0 | 1.5 | --- | --- | --- | 8.9 | 82 |
| 2,4,5-TCPO-(bis(2,4,5-trichlorophenyl)oxalate) | | | | | | | | | | | | | | | | |
| 6 | 0.01 | 0.6[h] | 0.025 | 0.33[i] | 84[j] | 16[k] | --- | --- | --- | --- | --- | --- | --- | --- | 7.14 | 18 | a. Experiments at 25°C. TCAPO is bis(2,4,5-trichloro-6-carboxyphenyl)oxalate; HPEA is 9,10-bis(phenyl-ethynyl)anthracene; Na Sal - sodium salicylate; DEC = diethyl glycol diethyl ether.
b. Time required for intensity to reach its maximum.
c. Time required for the emission of 75% of the total light.
d. Quantum yield based on the initial TCAPO concentration.
e. Integrated light output per unit volume.
f. Ethyl benzoate.
g. 2-octanol.
h. Rubrene.
i. Triethylamine.
j. Dimethyl phthalate.
k. Benzene.

I claim:
1. A composition adapted to be reacted with hydrogen peroxide to provide a chemiluminescent light, said composition containing the ingredients (1) a compound of the formula:

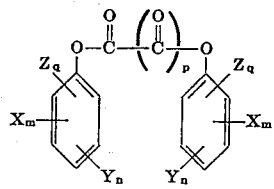

where:
X represents a substituent having a Hammett sigma constant greater than 0;
Y represents a carboxy group;
Z represents a member selected from the group consisting of hydrogen, alkyl, and alkoxy alkyl;
$m$, $n$ and $q$ are integers such that the combined Hammett sigma constant value of the X, Y and Z substituents on each phenyl group is between about 1.4 and 2.7, each of said $m$ and $n$ being always at least one; and
$p$ is an integer at least 1;
(2) and an organic fluorescent compound, the amount of said ingredients being such as to provide visible light.

2. A composition as in claim 1 wherein said compound is a bis(phenyl)oxalate ester derivative wherein $p$ is one.
3. A composition as in claim 2 wherein said compound is a bis(2,4,5-trichloro-6-carboxyphenyl)oxalate.
4. A composition as in claim 2 including, additionally, a basic catalyst.
5. A composition as in claim 4 wherein said compound is bis(2,4,5-trichloro-6-carboxyphenyl)oxalate.
6. A composition for a chemical lighting system containing the compounds of claim 2, wherein said oxalate and fluorescer are in the solid state.
7. A composition as in claim 6 comprising additionally, an organic solvent for said oxalate and fluorescer.
8. A composition as in claim 7 wherein said solvent contains a major proportion of a solvent selected from the group consisting of esters, aromatic hydrocarbons, chlorinated hydrocarbons and polyethers.
9. The composition of claim 8 wherein said solvent is a dialkylphthalate, said alkyl groups having from one to about 12 carbon atoms.
10. A composition as in claim 2 wherein said fluorescer is selected from the group consisting of 9,10-bis-(phenylethynyl)anthracene; 1-methoxy-9,10-bis(-phenylethynyl)-anthracene; 9,10-diphenylanthracene; perylene.

* * * * *

UNITED STATES PATENT AND TRADEMARK OFFICE
CERTIFICATE OF CORRECTION

PATENT NO. : 3,816,326

DATED : June 11, 1974

INVENTOR(S) : Laszlo Joseph Bollyky

It is certified that error appears in the above-identified patent and that said Letters Patent is hereby corrected as shown below:

In Column 1, insert the following statement as the first paragraph of the Specification:

--The invention herein described was made in the course of or under a contract (Contract No. N60921-67-C-0214) or subcontract thereunder, (or grant) with the Department of the Navy.--

Signed and Sealed this

Eighteenth Day of September, 1990

Attest:

HARRY F. MANBECK, JR.

*Attesting Officer*     *Commissioner of Patents and Trademarks*